UNITED STATES PATENT OFFICE.

UMETARO SUZUKI, OF TOKYO, JAPAN.

SODIUM COMPOUND OF DIOXY-DIAMINO-ARSENO-BENZOL-DIHYDROCHLORID.

1,330,288.  Specification of Letters Patent.  Patented Feb. 10, 1920.

No Drawing.  Application filed June 7, 1916. Serial No. 102,317.

*To all whom it may concern:*

Be it known that I, UMETARO SUZUKI, subject of the Emperor of Japan, residing at Tokyo, have made a certain new and useful invention in Sodium Compound of Dioxy - Diamino - Arseno - Benzol - Dihydrochlorid and Process of Making the Same, of which the following is a specification.

This invention relates to sodium compound of dioxy-diamino-arseno-benzol-dihydrochlorid, and the process of making the same.

The object of the invention is to improve the commercial product known as "salvarsan" (dioxy-diamino-arseno-benzol-dihydrochlorid) so as to remove the danger and disadvantages attending the use of said product.

Salvarsan $(C_6H_3(NH_2)(OH)As)_2 2HCl$ is an acid and cannot be used in its original form. Previous to its use it ought to be treated with an alkali. This treatment has to be carried out with great caution as both an excessive, as well as an insufficient quantity of the latter causes pain to patients using the same and renders it harmful. This is one of the disadvantages salvarsan has and therefore there has been a constant effort to remove this defect and this effort was partially successful in the discovery of neo-salvarsan. The latter can be used directly without any such previous treatment which as above pointed out demands a great deal of skill and caution. It is, however, less effective in its healing action than the original salvarsan. The effort to find a substance which is as effective as salvarsan, and which can be used without previous cautious treatment, has been thus far unsuccessful. The present invention relates to such substance and the method of preparing same.

Salvarsan has another serious disadvantage. When it is treated with alkali and is ready for use, it is liable to rapid oxidation, and is thereby converted into such a strong poison that it may be fatal to the patient treated with same. This naturally renders necessary the preliminary cautious treatment of salvarsan with an alkali each time directly before use, in order to prevent the most serious effect of poisoning on account of partially oxidized salvarsan solution. In other words, salvarsan cannot be preserved in a form ready for use because of its great instability and rapid oxidation. It is among the special objects of the present invention to provide a substance and method of preparing the same which excludes such danger and which can be preserved in a form ready for use, and which is as effective as salvarsan in its healing action.

In carrying out my invention I take dioxy-diamino-arseno - benzol - dihydrochlorid $(AsC_6H_3(OH)NH_2HCl)$ say, for example, five grams, and moisten the same with alcohol, say, for example, 5 c. c.; and then dissolve the moistened mass in methyl alcohol, for example 40 to 50 c. c. To the resulting clear yellow solution is added sodium ethylate, or sodium methylate solution (which may be prepared, for example, by dissolving 4 grams of metallic sodium in 100 c. c. of absolute ethyl alcohol or methyl alcohol, respectively), to the extent, in the example stated, of 24 to 25 c. c. The resulting thick brownish yellow precipitate at first produced partly dissolves again by the further addition of the sodium ethylate, or sodium methylate solution, as the case may be. In order to ascertain whether or not a sufficient quantity of the sodium ethylate, or of the sodium methylate has been used a few drops of the liquid are added to 3 to 5 c. c. of water. If the liquid does not dissolve quite clear a little more of the sodium ethylate, or sodium methylate solution is added to the methyl alcohol solution. Care, of course, must be exercised to avoid an excess of sodium ethylate, or sodium methylate solution. The whole liquid is then poured into ether, for example 500 c. c., into which ethyl alcohol, say 30 to 50 c. c. has been added and well mixed by shaking or otherwise. The resulting yellowish brown precipitate is then removed by filtration or otherwise, is washed with ether and suitably dried, as, for instance, in a vacuum desiccator. The yield of sodium compound thus obtained, employing the quantities of materials given in the above example, is from 5 to 6 grams.

In order to avoid the possibility of the compound containing noxious or poisonous oxidation products which the presence of even slight quantities of oxygen may produce, the whole process should be carried out in a current or an atmosphere of non-oxidizing gas such as hydrogen or nitrogen gas.

The resulting sodium compound, prepared and produced in the manner and according to the process above set forth, is an amorphous yellowish brown powder, soluble in water or in physiological salt solution with a resulting light yellow color, and having a slightly alkaline reaction. It is also soluble in methyl alcohol, but is nearly insoluble in ether petroleum, ether, ethyl alcohol, and acetone. The arsenic content of the compound is about 22% to 23%.

The sodium compound produced as described, not being an acid does not require neutralization but can be used directly, when dissolved in water or physiological salt as an injection, and can be preserved indefinitely in a form in which it is capable of direct use without danger of the formation of noxious or poisonous substances through oxidation.

Having now set forth the objects and nature of my invention, what I claim as new and useful and of my own invention, and desire to secure by Letters Patent, is—

1. The process of manufacturing sodium compounds of dioxy-diamino-arseno-benzol-dihydrochlorid, which consists in mixing a solution of the dioxy-diamino-arseno-benzol-dihydrochlorid with an alkaline solution containing a sodium compound, and precipitating and recovering the resulting sodium compounds.

2. The process which consists in adding a solution of sodium ethylate or sodium methylate to an alcoholic solution of dioxy-diamino-arseno-benzol-dihydrochlorid and precipitating and recovering the resulting sodium compounds therefrom.

3. The process which consists in adding alcoholic solution of sodium alcoholate to a solution of dioxy-diamino-arseno-benzol-dihydrochlorid and precipitating and recovering the resulting sodium compounds therefrom.

4. The process which consists in adding methyl alcohol solution of a metallic sodium compound to a methyl alcoholic solution of dioxy-diamino-arseno-benzol-dihydrochlorid and precipitating and recovering the resulting sodium compounds therefrom.

5. The process of manufacturing sodium compounds of dioxy-diamino-arseno-benzol-dihydrochlorid which consists in mixing a solution of sodium alcoholate with a solution of dioxy-diamino-arseno-benzol-dihydrochlorid and then precipitating the resulting sodium compounds by adding ether to said solution.

6. The process which consists in mixing a solution of dioxy-diamino-arseno-benzol-dihydrochlorid with a solution containing a sodium compound, and precipitating and recovering from the liquid the resulting sodium compounds, the application being carried out in an atmosphere of nonoxidizing gas.

7. The process which consists in adding alcoholic solution of sodium methylate to methyl alcoholic solution of dioxy-diamino-arseno-benzol-dihydrochlorid and precipitating and recovering the resulting sodium compounds therefrom.

8. The process which consists in mixing a solution of dioxy-diamino-arseno-benzol-dihydrochlorid with a solution containing a sodium compound, and precipitating and recovering from the liquid the resulting sodium compounds.

In testimony whereof I affix my signature in presence of two witnesses.

UMETARO SUZUKI.

Witnesses:
S. NAKANO,
S. HORIZA.